US 9,451,478 B2

(12) United States Patent
Jung et al.

(10) Patent No.: US 9,451,478 B2
(45) Date of Patent: Sep. 20, 2016

(54) METHOD FOR SUPPORTING MOBILITY OF USER EQUIPMENT BASED ON A SELECTIVE MOBILITY COUNTING IN A WIRELESS COMMUNICATION SYSTEM AND APPARATUS FOR THE SAME

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/110,088

(22) PCT Filed: Apr. 4, 2012

(86) PCT No.: PCT/KR2012/002538
§ 371 (c)(1),
(2), (4) Date: Oct. 4, 2013

(87) PCT Pub. No.: WO2012/138128
PCT Pub. Date: Oct. 11, 2012

(65) Prior Publication Data
US 2014/0024360 A1 Jan. 23, 2014

Related U.S. Application Data

(60) Provisional application No. 61/471,670, filed on Apr. 4, 2011.

(51) Int. Cl.
*H04Q 7/10* (2006.01)
*H04W 24/02* (2009.01)
(Continued)

(52) U.S. Cl.
CPC ......... *H04W 24/02* (2013.01); *H04W 36/0083* (2013.01); *H04W 28/08* (2013.01); *H04W 36/04* (2013.01); *H04W 36/22* (2013.01)

(58) Field of Classification Search
CPC .............. H04W 28/0226; H04W 36/0022; H04W 36/0044; H04W 36/0061; H04W 36/0094; H04W 24/02; H04W 36/0083; H04W 28/08; H04W 36/04; H04W 36/22
USPC ....... 455/436, 437, 438, 439, 441, 443, 444, 455/447
See application file for complete search history.

(56) References Cited

U.S. PATENT DOCUMENTS 8,064,913 B2 * 11/2011 Gummadi et al. ............ 455/441
8,855,637 B2 * 10/2014 Robbins et al. ............... 455/436
(Continued)

FOREIGN PATENT DOCUMENTS

KR 10-2006-0073472 6/2006
KR 10-2010-0071850 6/2010
KR 10-2011-0011554 2/2011

OTHER PUBLICATIONS

LG Electronics Inc., "Unnecessary Mobility State change in CSG or Hybrid cells," 3GPP TSG-RAN WG2 #68, R2-096941, Nov. 2009, 2 pages.
(Continued)

*Primary Examiner* — Wayne Cai
*Assistant Examiner* — Julio Perez
(74) *Attorney, Agent, or Firm* — Lee, Hong, Degerman, Kang & Walmey; Jonathan Kang; Michael Monaco

(57) ABSTRACT

A method for supporting a mobility of a user equipment (UE) in a wireless communication system is provided. The method includes: acquiring mobility context; performing the mobility with a target cell; determining whether non-updating criterion is satisfied based on the mobility context; updating a mobility counter of the UE based on the result of the determining; performing a mobility state estimation (MSE) by estimating a mobility state of the UE based on the updated mobility counter of the UE; and scaling a mobility parameter based on the estimated mobility state.

5 Claims, 14 Drawing Sheets

(51) Int. Cl.
*H04W 36/00* (2009.01)
*H04W 28/08* (2009.01)
*H04W 36/04* (2009.01)
*H04W 36/22* (2009.01)

(56) References Cited

U.S. PATENT DOCUMENTS

| | | | |
|---|---|---|---|
| 2005/0037798 A1* | 2/2005 | Yamashita et al. | 455/525 |
| 2008/0220782 A1* | 9/2008 | Wang et al. | 455/436 |
| 2008/0233958 A1 | 9/2008 | Robbins et al. | |
| 2010/0113019 A1 | 5/2010 | Jeong et al. | |
| 2010/0118725 A1 | 5/2010 | Chiou et al. | |
| 2010/0222055 A1* | 9/2010 | Cho | H04J 11/0086 455/434 |
| 2011/0021201 A1 | 1/2011 | Lee et al. | |

OTHER PUBLICATIONS

European Patent Office Application Serial No. 12767229.3, Search Report dated Mar. 30, 2015, 8 pages.

Korean Intellectual Property Office Application Serial No. 10-2013-7029196, Notice of Allowance dated Jul. 10, 2015, 2 pages.

\* cited by examiner

-----▶ Mobility Counter is NOT increased
———▶ Mobility Counter is increased

METHOD FOR SUPPORTING MOBILITY OF USER EQUIPMENT BASED ON A SELECTIVE MOBILITY COUNTING IN A WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2012/002538, filed on Apr. 4, 2012, which claims the benefit of U.S. Provisional Application Ser. No. 61/471,670, filed on Apr. 4, 2011, the contents of which are all hereby incorporated by reference herein in their entirety.

TECHNICAL FIELD

The present invention relates to a wireless communication system, and more particularly, to a method and apparatus for supporting a mobility of user equipment based on selective mobility counting in a wireless communication system.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

Each cell has a fixed coverage, and the UE moves at a variable speed in a wireless communication system. Thus, how frequently the UE will perform the mobility may vary depending on a situation. In order to support the mobility of the UE by considering a mobility state of the UE, a method for mobility state estimation and scaling of a mobility parameter has been supported.

Meanwhile, the mobility may be performed due to a reason other than a case where the UE actually moves. For example, whether to perform inter-frequency mobility can be determined on the basis of a priority assigned to a cell frequency. When performing of the mobility caused by a reason which is less related to the actual movement of the UE is counted as a mobility counter and MSE is performed based thereon, it may be difficult to support the mobility suitable for an actual mobility state of the UE. Therefore, there is a need for a method for determining the mobility of the UE by selectively considering the mobility performed by the UE and for supporting the mobility of the UE according to the determination result.

SUMMARY OF INVENTION

Technical Problem

The present invention provides a method and an apparatus for supporting a mobility of user equipment in a wireless communication system.

Solution to Problem

In an aspect, a method for supporting a mobility of a user equipment (UE) in a wireless communication system is provided. The method includes: acquiring mobility context; performing the mobility with a target cell; determining whether non-updating criterion is satisfied based on the mobility context; updating a mobility counter of the UE based on the result of the determining; performing a mobility state estimation (MSE) by estimating a mobility state of the UE based on the updated mobility counter of the UE; and scaling a mobility parameter based on the estimated mobility state.

The step of the updating the mobility counter of the UE may include maintaining the mobility counter of the UE, if the non-updating criterion is satisfied.

The step of the updating the mobility counter of the UE may further include increasing the mobility counter of the UE by a predetermined value, if the non-updating criterion is not satisfied.

The mobility context may include one or more among: a measured quality of a source cell; a source cell frequency; a target cell frequency; a priority of the source cell frequency; and a priority of the target cell frequency.

The step of the determining whether the non-updating criterion is satisfied may include determining the non-updating criterion is satisfied, if the measured quality of the source cell is greater than a predetermined threshold.

The step of the determining whether the non-updating criterion is satisfied may include determining the non-updating criterion is satisfied, if the target cell frequency is different from the source cell frequency.

The step of the determining whether the non-updating criterion is satisfied may include determining the non-updating criterion is satisfied, if the target cell frequency is different from the source cell frequency and the measured quality of the source cell is greater than a predetermined threshold.

The step of the determining whether the non-updating criterion is satisfied may include determining the non-updating criterion is satisfied, if the priority of the target cell frequency is greater than the priority of the source cell frequency.

The step of determining whether the non-updating criterion is satisfied may include determining the non-updating criterion is satisfied, if the priority of the target cell frequency is greater than the priority of the source cell frequency and the measured quality of the source cell is greater than a predetermined threshold.

The step of the performing the mobility with the target cell may include performing cell reselection with the target cell, if the UE operates in an RRC_IDLE mode.

The step of the performing the mobility with the target cell may further include performing handover with the target cell, if the UE operates in an RRC_CONNECTED mode.

In another aspect, a wireless apparatus is provided. The apparatus includes: a radio frequency (RF) unit transmitting and receiving a radio signal; a processor operably coupled to the RF unit, wherein the processor is configured for: acquiring mobility context; performing mobility with a target cell; determining whether non-updating criterion is satisfied based on the mobility context; updating a mobility counter of the wireless apparatus based on the result of the determining; performing a mobility state estimation (MSE) by estimating a mobility state of the wireless apparatus based on the updated mobility counter of the wireless apparatus; and scaling a mobility parameter based on the estimated mobility state.

The updating the mobility counter of the wireless apparatus may include maintaining the mobility counter of the wireless apparatus, if the non-updating criterion is satisfied.

The updating the mobility counter of the wireless apparatus may further include increasing the mobility counter of the wireless apparatus by a predetermined value, if the non-updating criterion is not satisfied.

Advantageous Effects of Invention

When a user equipment (UE) performs mobility, a mobility counter can be selectively updated on the basis of non-updating criteria. Since a handover or a cell reselection which is less related to actual movement of the UE is excluded from targets of mobility counting, a UE mobility state estimated by mobility state estimation (MSE) can more correctly consider an actual UE mobility state. Accordingly, since the UE can more properly scale a mobility parameter than the conventional method, the mobility of the UE can be more effectively supported.

MODE FOR THE INVENTION

Figure 1:
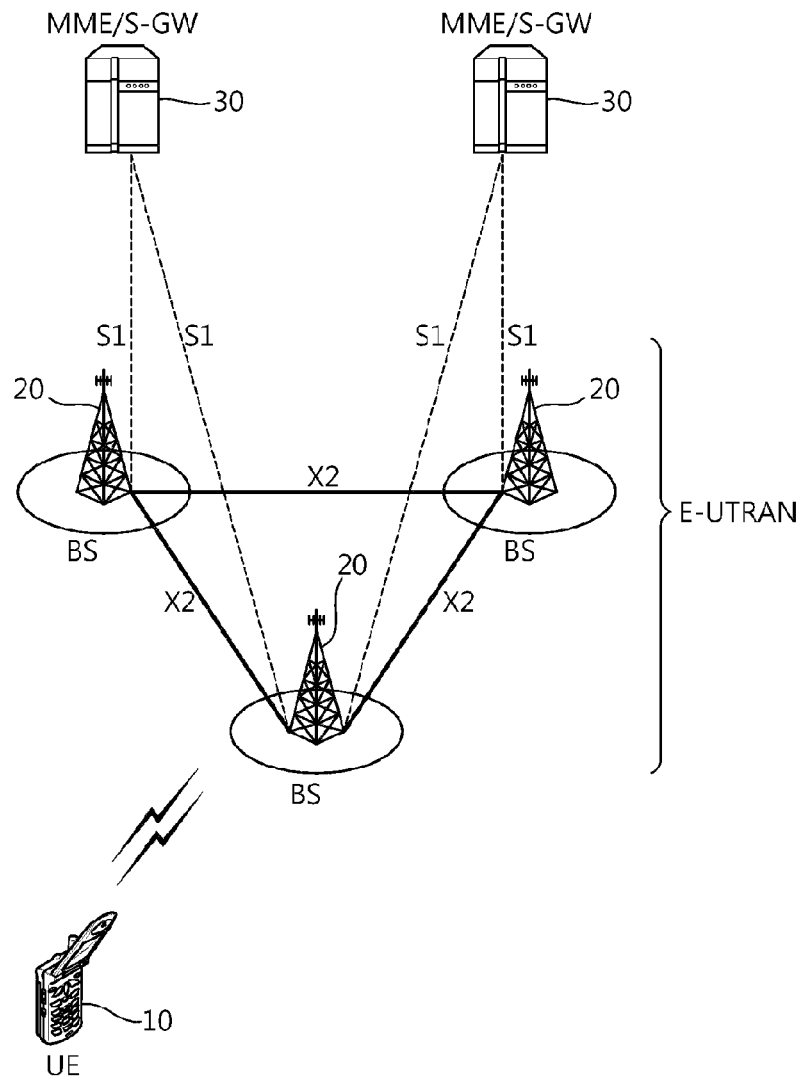
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
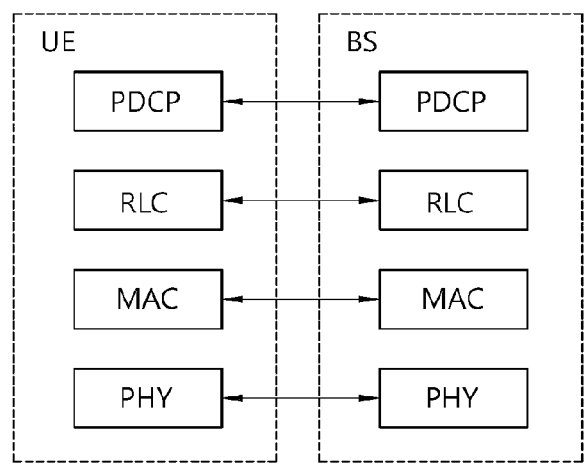
FIG. 2 is a diagram illustrating a radio protocol architecture for a user plane.
Figure 3:
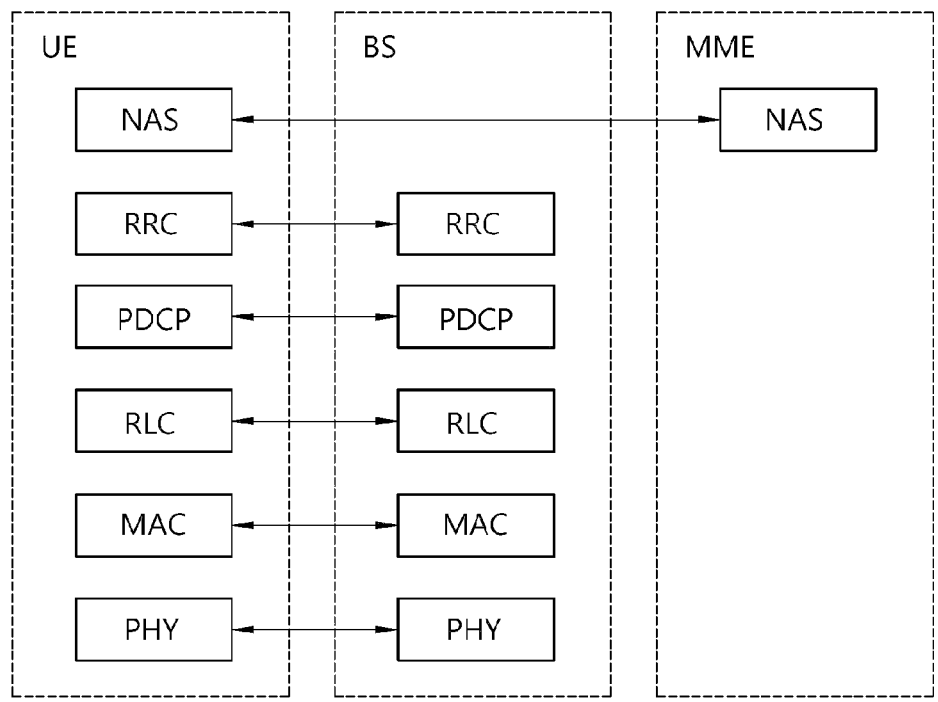
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information, a paging channel (PCH) for transmitting paging messages and a downlink-shared channel (SCH) for transmitting user traffic or control messages. The user traffic of downlink multicast or broadcast services (e.g. multimedia broadcast/multicast service (MBMS)) or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Logical channels belonging to a higher channel of the transport channel and mapped onto the transport channels. The logical channels are classified into a logical channel for control and a logical channel for traffic. Examples of the logical channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

MBMS is a service provides multimedia data to user equipments located in a cell. MCH which is a transport channel for MBMS may be mapped to logical channel MCCH or MTCH. The MCCH transmits RRC messages related to the MBMS, and the MTCH transmits traffic of a specific MBMS service.

A plurality of MCHs may be used in accordance with capacities of the MTCH and the MCCH in one cell. The MCH is charge of transmitting two logical channels, the MTCH and the MCCH, and the MCH is mapped to a physical channel PMCH.

A MCCH is present in each area of a MBMS single frequency network (MBSFN) transmitting an identical MBMS information/traffic. When a plurality of areas of MBSFN are provided in one cell, a UE may receive a plurality of MCCHs. When a RRC message related to MBMS is changed in a specific MCCH, a PDCCH transmits MBMS radio network temporary identity (M_RNTI) and indicator indicating the specific MCCH.

A UE supporting MBMS receives the M-RNTI and the MCCH indicator through the PDCCH and determines that the RRC massage related to the MBMS is changed in the specific MCCH. So the UE can receive the specific MCCH. A RRC message of MCCH may periodically be changed, and may repeatedly be broadcasted in a repetition interval.

In conventional communication system, the network can calculate the number of UE receiving a specific service through a counting procedure. The conventional counting procedure consists of transmitting, by the UE, a uplink counting response message in response to a downlink counting request message transmitted by the network.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
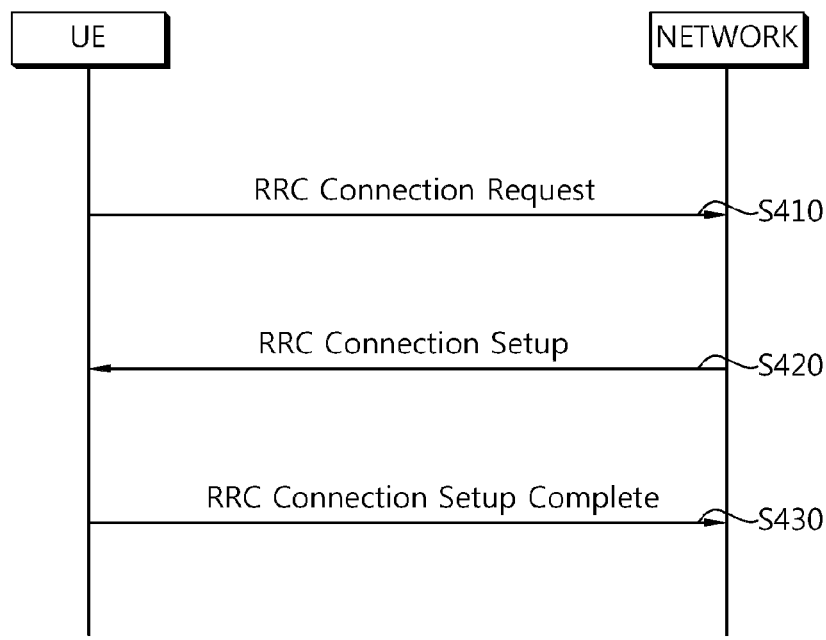
FIG. 4 is a flowchart showing an RRC connection establishment procedure.

FIG. 4 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 5:
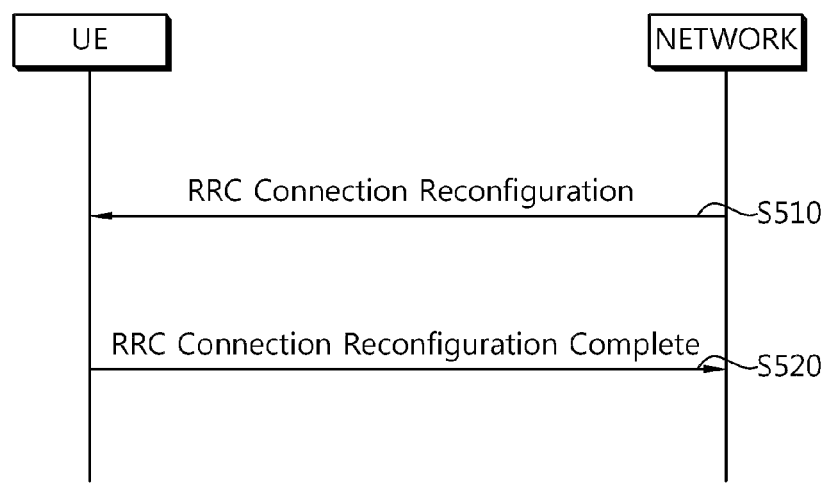
FIG. 5 is a flowchart showing an RRC connection reconfiguration procedure.

FIG. 5 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 6:
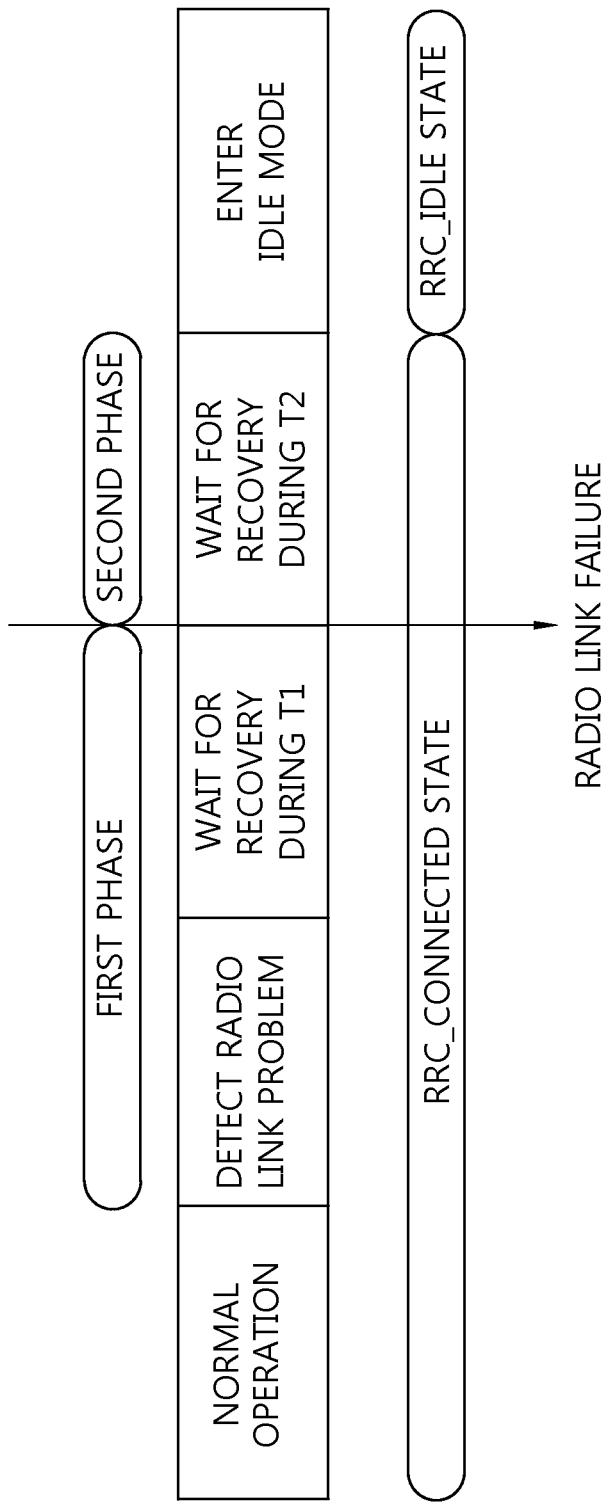
FIG. 6 shows an example of a radio link failure. An operation related to the radio link failure can be described in two phases.

FIG. 6 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC idle state. Alternatively, the UE may perform an RRC re-establishment procedure.

The RRC connection re-establishment procedure is a procedure for re-establishing an RRC connection in an RRC connected state. Since the UE does not enter the RRC idle state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 7:
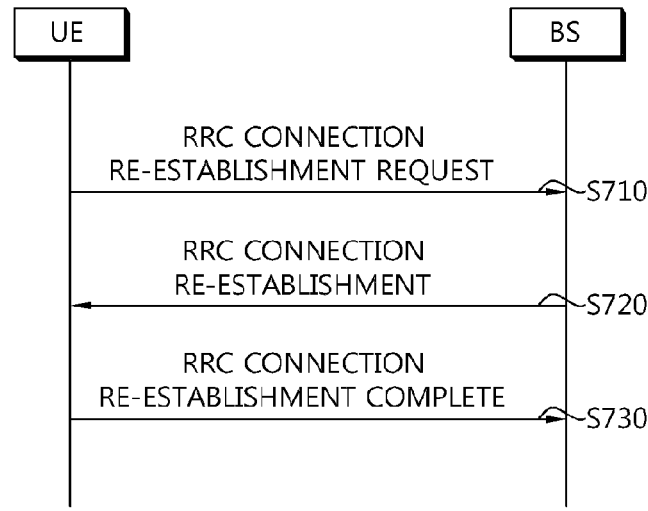
FIG. 7 is a flowchart showing a success of a connection re-establishment procedure.

FIG. 7 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S710).

If the selected cell is a cell having the context of the UE, i.e., a prepared cell, the BS accepts the RRC connection re-establishment request of the UE, and transmits an RRC connection re-establishment message to the UE (step S720). The UE transmits an RRC connection re-establishment complete message to the BS, and thus the RRC connection re-establishment procedure can be successful (step S730).

Figure 8:
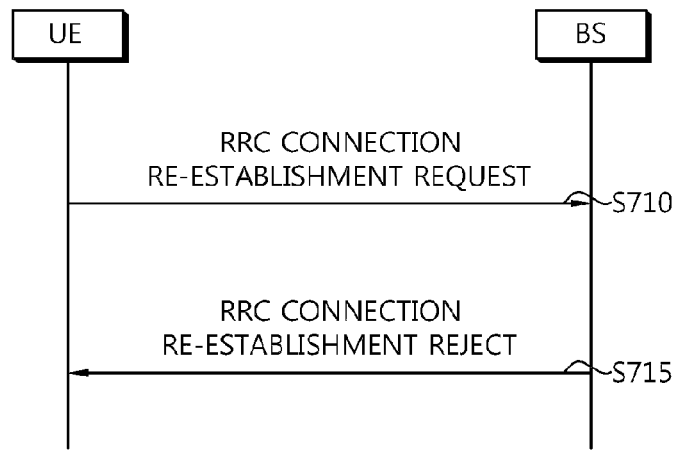
FIG. 8 is a flowchart showing a failure of a connection re-establishment procedure.

FIG. 8 is a flowchart showing a failure of a connection re-establishment procedure. A UE transmits an RRC connection re-establishment request message to a BS (step S710). If a selected cell is not a prepared cell, a BS transmits an RRC connection re-establishment reject message to the UE in response to an RRC connection re-establishment request (step S715).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.
  Inter-frequency cell reselection: A reselected cell is a cell having the same RAT and a different center-frequency with respect to those used in the cell on which the UE is currently being camped.
  Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{means,s} + Q_{hyst}, R_n = Q_{means,n} - Q_{offset}$$ [Math.1]

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 9:
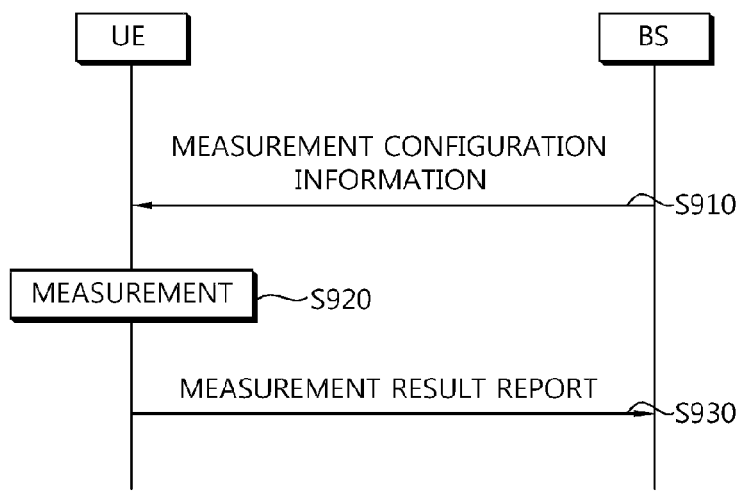
FIG. 9 is a flowchart showing a conventional method of performing measurement.

FIG. 9 is a flowchart showing a conventional method of performing measurement.

A UE receives measurement configuration information from a BS (step S910). A message including the measurement configuration information is referred to as a measurement configuration message. The UE performs measurement based on the measurement configuration information (step S920). If a measurement result satisfies a reporting condition included in the measurement configuration information, the UE reports the measurement result to the BS (step S930). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 10:
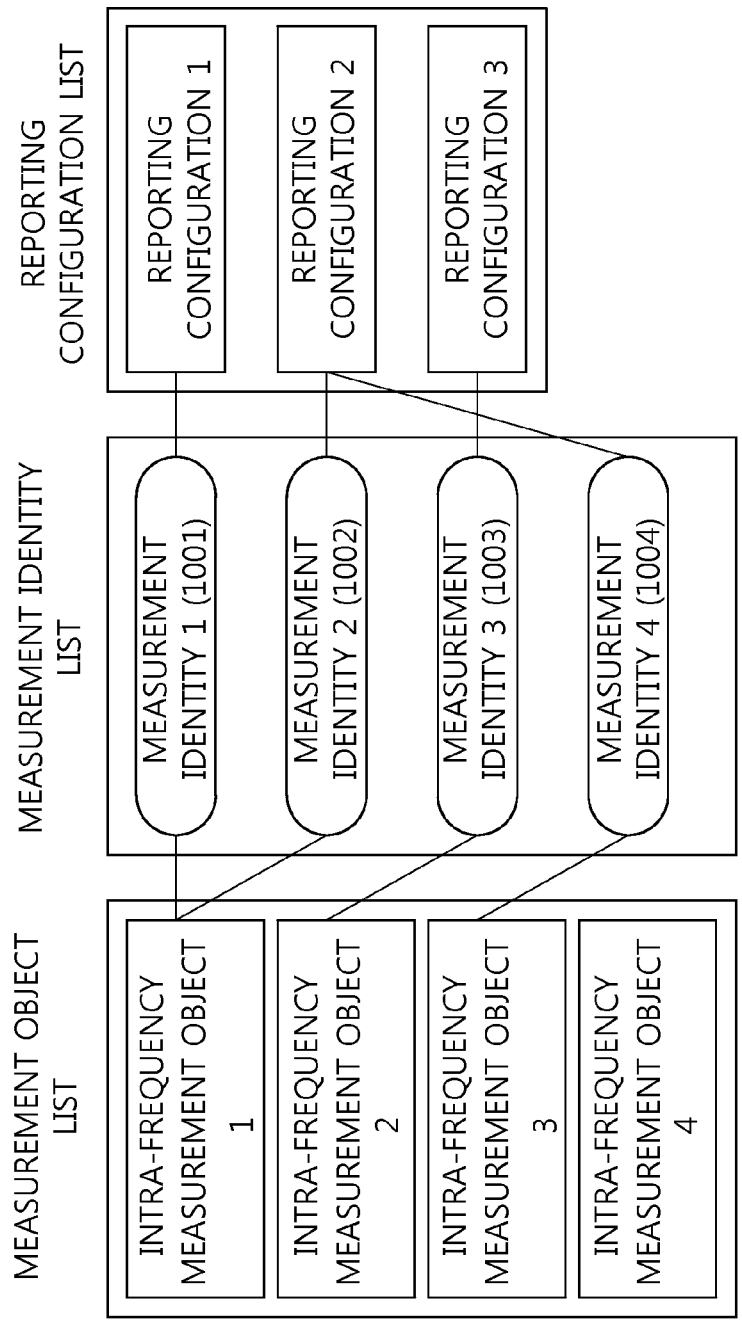
FIG. 10 shows an example of a measurement configuration assigned to a UE.

FIG. 10 shows an example of a measurement configuration assigned to a UE.

First, a measurement identity1 1001 associates an intra-frequency measurement object with a reporting configuration 1. The UE performs intra-frequency measurement. The reporting configuration 1 is used to determine a reporting type and a criterion for reporting a measurement result.

A measurement identity2 1002 is associated with the intra-frequency measurement object similarly to the measurement identifier1 1001, and associates the intra-frequency measurement object with a reporting configuration 2. The UE performs intra-frequency measurement. The reporting configuration 2 is used to determine a reporting format and a criterion for reporting a measurement result.

By using the measurement identity1 1001 and the measurement identity2 1002, the UE transmits a measurement result even if the measurement result on the intra-frequency measurement object satisfies any one of the reporting configuration 1 and the reporting configuration 2.

A measurement identity3 1003 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 1004 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 11:
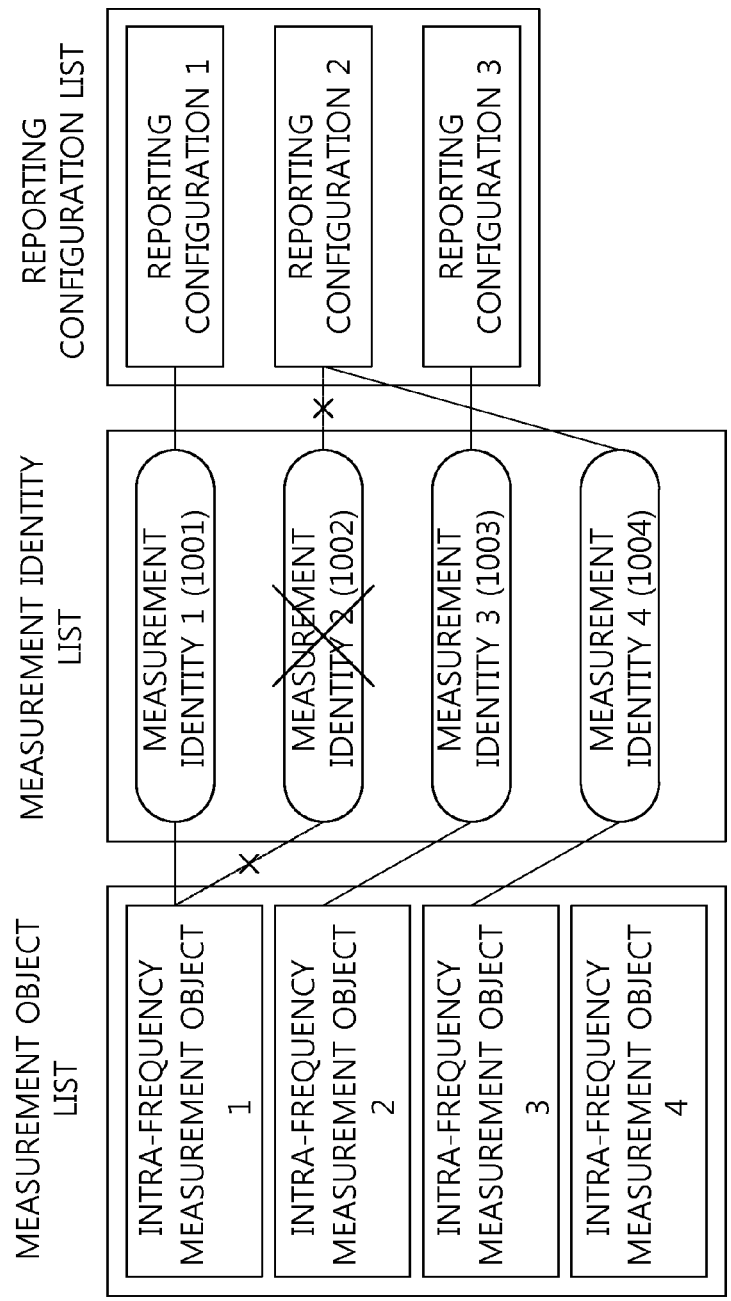
FIG. 11 shows an example of deleting a measurement identity.

FIG. 11 shows an example of deleting a measurement identity. When a measurement identity2 1002 is deleted, measurement on a measurement object associated with the measurement identity2 1002 is suspended, and a measurement report is not transmitted. A reporting configuration or a measurement object associated with the deleted measurement identity may not be modified.

Figure 12:
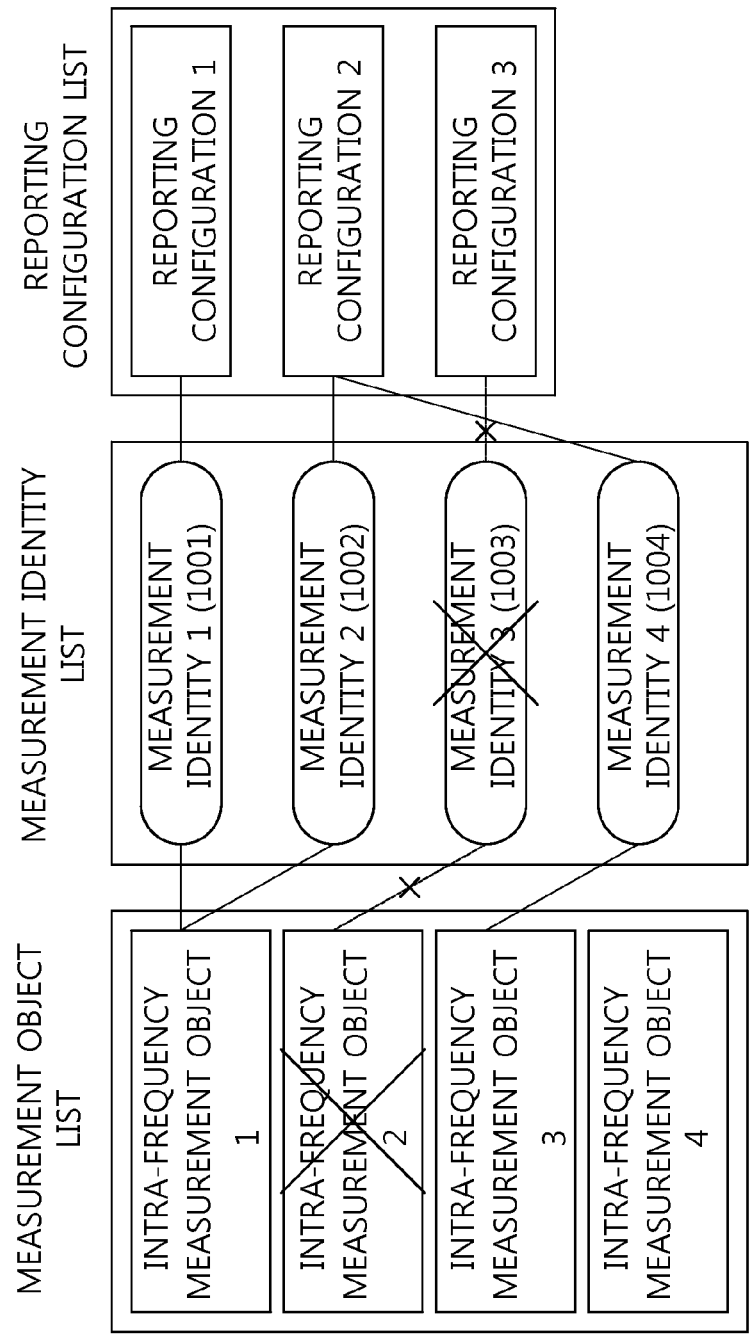
FIG. 12 shows an example of deleting a measurement object.

FIG. 12 shows an example of deleting a measurement object. When an inter-frequency measurement object 1 is deleted, a UE also deletes an associated measurement identifier3 1003. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

Figure 13:
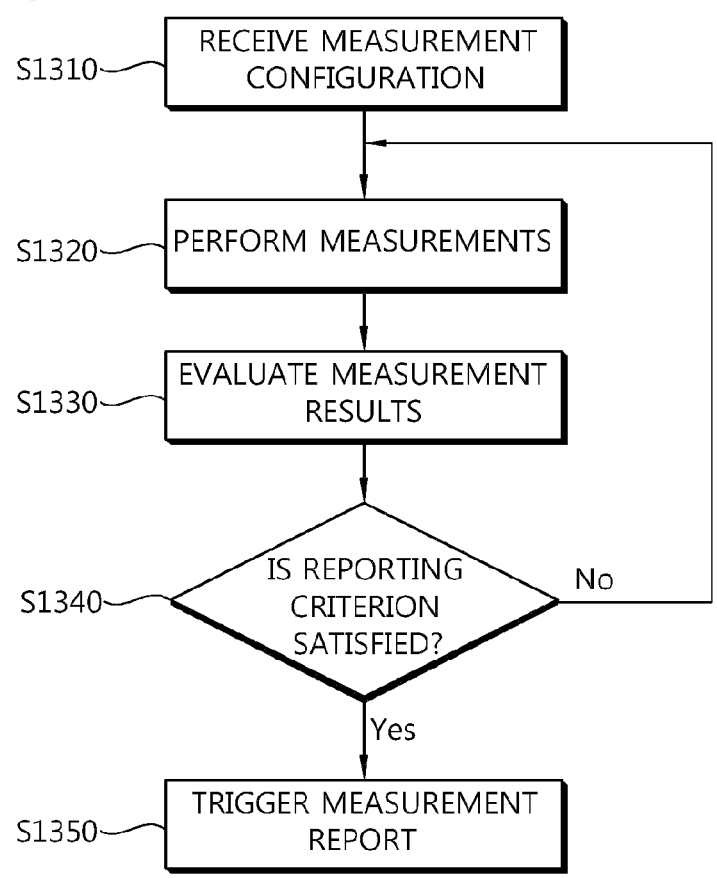
FIG. 13 shows a conventional measurement procedure.

FIG. 13 shows a conventional measurement procedure.

A UE receives a measurement configuration from a BS (S1310). The UE performs measurements for a measurement object identified by a measurement identity (S1320).

The UE evaluates measurement results to determine whether a reporting criterion is satisfied (S1330). If the reporting criterion is satisfied (S1340), measurement report is triggered.

The measurement report may include a measurement identity, a measured quantity of a serving cell and a measurement result of a neighboring cell. The measurement identity identifies a measurement object on which the measurement report is triggered. The measurement result of the neighboring cell may include a cell identity of the neighboring cell and a measured quantity of the neighboring cell. The measured quantity may include at least one of RSRP and RSRQ.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 14:
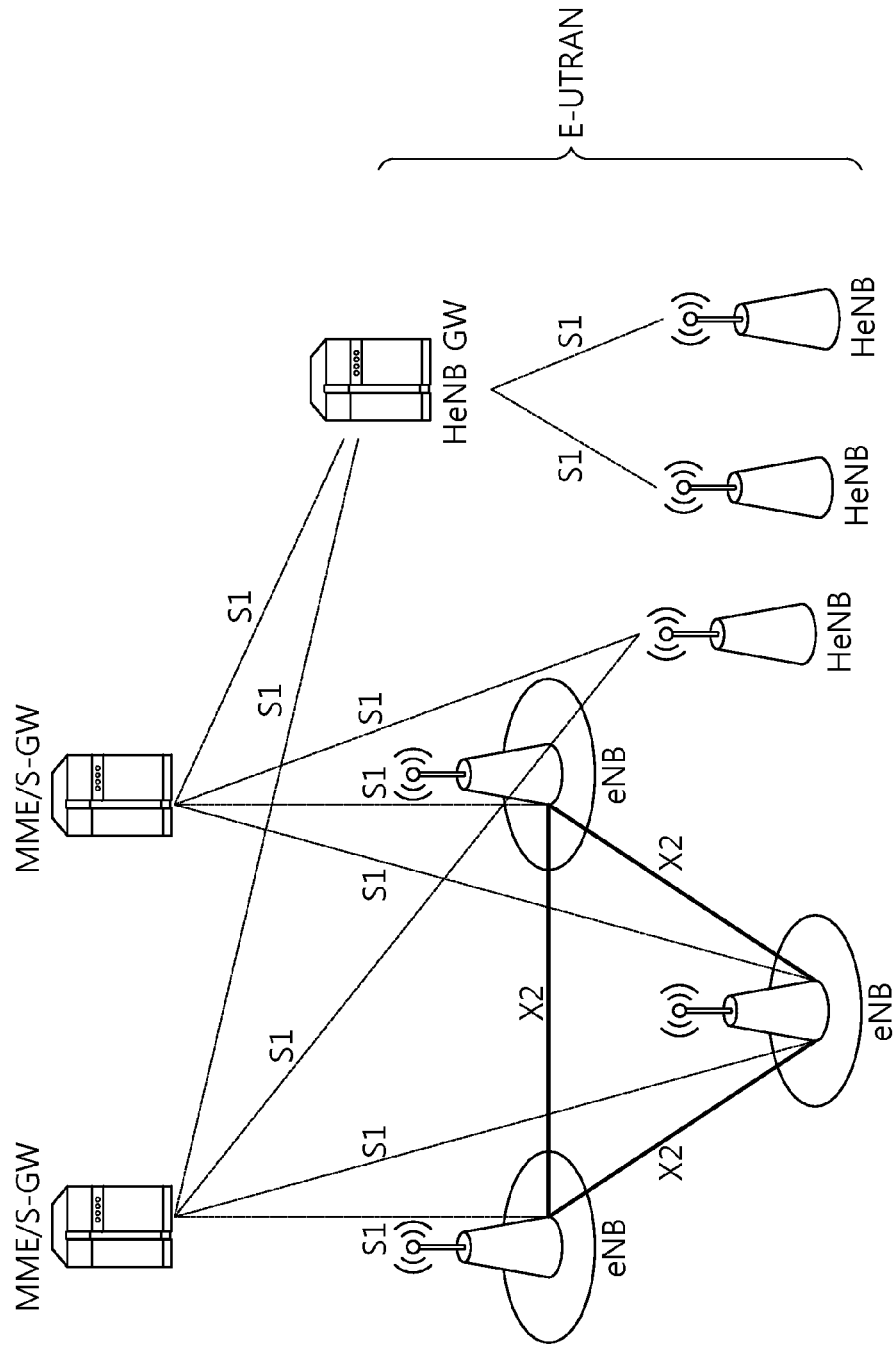
FIG. 14 shows an example of a wireless communication system for operating an HeNB.

FIG. 14 shows an example of a wireless communication system for operating an HeNB.

Referring to FIG. 14, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor. Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

In general, CSG cells and (normal) macro cells may be concurrently managed at a particular frequency. Such a frequency is hereinafter called a mixed carrier frequency. The network may reserve a physical layer cell identity for the CSG cell at the mixed carrier frequency. The physical layer cell identity is called a physical cell identity (PCI) in E-UTRAN and is called a physical scrambling code (PSC) in UTRAN. For clarity, the physical layer cell identity will be expressed by the PCI. In the mixed carrier frequency, the CSG cell notifies information on the PCI reserved for the CSG cell at a current frequency by using the system information. The UE that has received this information can determine whether or not this cell is a CSG cell from the PCI of the cell when a certain cell is found at the corresponding frequency.

In a case where a UE does not support the CSG-related function or has no CSG list to which the UE itself belongs, the UE does not need to regard a CSG cell as a selectable cell during a cell selection/reselection process. In this case, the UE checks for only the PCI of the cell, and may immediately excludes the corresponding cell in the cell selection/reselection process if the PCI is a reserved PCI for the CSG. In general, the PCI of a certain cell can be immediately known during a process of checking for the existence of the corresponding cell in a physical layer by the UE.

In case of a UE having a CSG list to which the UE itself belongs, when the UE wants to know a list of neighboring CSG cells at a mixed carrier frequency, it may be known that the corresponding cell is a CSG cell if only a cell having the PCI reserved for CSG is found, instead of individually checking for the CSG ID of the system information for every cell found in the whole PCI range.

Now, a cell reselection method related to a CSG cell will be described.

The CSG cell is a cell for providing better-quality CSG services to its member UE. Therefore, when the UE is camped on the CSG cell, an inter-frequency cell reselection may not be appropriate in terms of QoS even if the UE finds an inter-frequency having a higher priority than a frequency priority of a serving frequency.

When the UE is camped on the CSG cell, in order to prevent an inter-frequency cell having a higher priority than the serving frequency from being selected in a cell reselection, if a CSG cell of a certain frequency is determined as a best-ranked cell according to a cell reselection evaluation criterion at that frequency, the UE assumes that a frequency priority of the corresponding frequency is higher than other frequencies. As such, when a frequency priority higher than a frequency priority that can be assigned by the network is assigned by the UE to a particular frequency, such a frequency priority is called an 'implicit highest priority'. In doing so, it is possible to help the UE to camp on the CSG cell without violation of the existing cell selection rule in which the frequency priority is first considered when the UE performs the cell reselection. If the UE camped on the CSG cell reselects a non-CSG cell of the corresponding frequency, the UE withdraws the assumption on the implicit highest priority of the CSG cell, and uses a frequency priority value delivered by the network in a cell reselection evaluation process. If the UE finds another best-ranked CSG cell at a frequency having the same frequency priority when the UE is camped on the CSG cell, whether the UE will reselect the CSG cell or will stay in the CSG cell on which the UE is currently being camped on is determined based on an implementation of the UE.

Subsequently, a handover method related to a CSG cell will be described.

While the UE is in RRC_CONNECTED state, the UE performs normal measurement and mobility procedures based on configuration provided by the network. The UE is not required to support manual selection of CSG IDs while in RRC_CONNECTED state. Handover to a HNB/HeNB follows the framework of UE assisted network controlled handover. Handover to a HNB/HeNB is different from the normal handover procedure in three aspects.

1. Proximity Estimation: in case the UE is able to determine, using autonomous search procedures, that it is near a CSG or hybrid cell whose CSG ID is in the UE's CSG whitelist, the UE may provide to the source eNB an indication of proximity. The proximity indication may be used as follows:

If a measurement configuration is not present for the concerned frequency/RAT, the source eNB may configure the UE to perform measurements and reporting for the concerned frequency/RAT.

The source eNB may determine whether to perform other actions related to handover to HNB/HeNBs based on having received a proximity indication (for example, the source eNB may not configure the UE to acquire system information of the HNB/HeNB unless it has received a proximity indication).

2. PSC/PCI Confusion: due to the typical cell size of HNB/HeNBs being much smaller than macro cells, there can be multiple HNBs/HeNBs within the coverage of the source eNB that have the same PSC/PCI. This leads to a condition referred to as PSC/PCI confusion, wherein the source eNB is unable to determine the correct target cell for handover from the PSC/PCI included in the measurement reports from the UE. PSC/PCI confusion is solved by the UE reporting the global cell identity of the target HNB/HeNB.

3. Access Control: if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network verifies the reported status.

Mobility from eNB/HeNB to a HeNB's CSG/hybrid cell takes place with the S1 Handover procedure. In the following call flow the source cell can be an eNB or a HeNB. The procedure applies to any scenario where the CSG ID is provided by the UE or provided by the source eNB.

Figure 15:
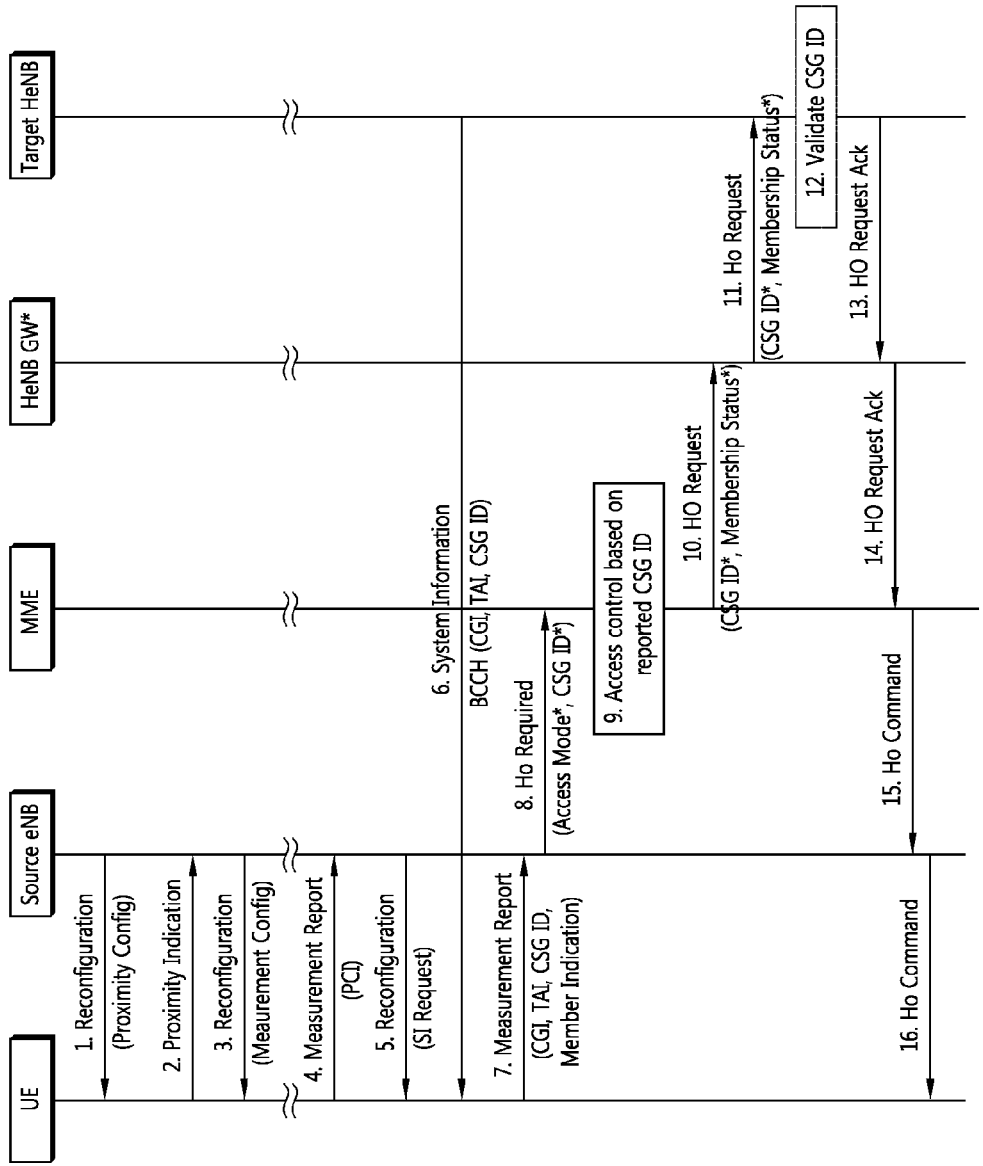
FIG. 15 is a flowchart showing a handover procedure for CSG cell.

FIG. 15 is a flowchart showing a handover procedure for CSG cell.

Referring to the FIG. 15, the handover procedure for the CSG cell follows:

Step. 1 The source eNB configures the UE with proximity indication control. For this, the source eNB may transmit a reconfiguration message to the UE. The configuration message includes information for a configuration of the proximity indication.

Step. 2 The UE sends an "entering" proximity indication when it determines it may be near a cell (based on autonomous search procedures) whose CSG ID is in the UE's CSG whitelist. The proximity indication includes the RAT and frequency of the cell.

Step. 3 If a measurement configuration is not present for the concerned frequency/RAT the source eNB configures the UE with relevant measurement configuration including measurement gaps as needed, so that the UE can perform measurements on the reported RAT and frequency. For this, the source eNB transmit a reconfiguration message to the UE. The reconfiguration message may include information for a configuration of the measurement.

The network may also use the proximity indication to minimize the requesting of handover preparation information of CSG/hybrid cells by avoiding requesting such information when the UE is not in the geographical area where cells whose CSG IDs are in the UEs CSG White-list are located.

Step. 4 The UE sends a measurement report including the PCI (e.g., due to triggered event A3).

Step. 5 The source eNB configures the UE to perform system information acquisition and reporting of a particular PCI.

Step. 6 The UE performs the system information acquisition using autonomous gaps, i.e., the UE may suspend reception and transmission with the source eNB within the limits defined in [TS 36.133] to acquire the relevant system information from the target HeNB.

Step. 7 The UE sends a measurement report including (E-)CGI, TAI, CSG ID and "member/non-member" indication.

Step. 8 The source eNB includes the target E-CGI and the CSG ID in the Handover Required message sent to the MME. If the target is a hybrid cell the Cell Access Mode of the target is included.

Step. 9 The MME performs UE access control to the CSG cell based on the CSG ID received in the Handover Required message and the stored CSG subscription data for the UE. If the access control procedure fails, the MME ends the handover procedure by replying with the Handover Preparation Failure message. If the Cell Access Mode is present, the MME determines the CSG Membership Status of the UE handing over to the hybrid cell and includes it in the Handover Request message.

Steps. 10-11 The MME sends the Handover Request message to the target HeNB including the target CSG ID received in the Handover Required message. If the target is a hybrid cell, the CSG Membership Status will be included in the Handover Request message.

Step. 12 The target HeNB verifies that the CSG ID received in the Handover Request message matches the CSG ID broadcast in the target cell and if such validation is successful it allocates appropriate resources. UE prioritisation may also be applied if the CSG Membership Status indicates that the UE is a member.

Steps. 13-14 The target HeNB sends the Handover Request Acknowledge (ACK) message to the MME via the HeNB GW if present.

Step. 15 The MME sends the Handover Command message to the source eNB.

Step. 16 The source eNB transmits the Handover Command (RRC Connection Reconfiguration message including mobility control information) to the UE.

The above Steps 1-9, 15 and 16 may also be applied to inter-RAT mobility from LTE to HNB.

After sending an "entering" proximity indication (step 2), if the UE determines that it is no longer near a cell whose CSG ID is in the UE's CSG whitelist, the UE sends a "leaving" proximity indication to the source eNB. Upon reception of this indication, the source eNB may reconfigure the UE to stop measurements on the reported RAT and frequency.

In the above procedure, steps 2 and 3 may not be performed in case the UE has not previously visited the HeNB, e.g., when the UE first visits a hybrid cell.

The PCI confusion is resolved by steps 5, 6 and 7. The source eNB can request the system information acquisition and reporting for any PCI, not limited to PSCs/PCIs of CSG or hybrid cells.

The following description is about scaling of a mobility-related parameter having an effect on mobility determination of a user equipment (UE) according to a UE mobility state. When the UE passes by cells at a fast speed, mobility to neighboring cells may not be achieved at a proper time, and thus a service disable state may occur. Therefore, the mobility-related parameter can be optimized for a UE speed so that mobility is well achieved according to the UE speed, thereby improving mobility performance. As such, when the UE determines a mobility state (i.e., performs mobility state estimation), and scales a parameter related to the mobility determination according to the UE mobility state, mobility of the UE can be more effectively supported.

The UE mobility state can be divided into a high mobility state, a medium mobility state, and a normal mobility state. Each mobility state can be determined on the basis of the number of times of performing a handover by the UE and/or the number of times of performing a cell reselection.

The UE in the RRC_IDLE state performs the cell reselection when a cell reselection criterion is satisfied. If the number of times of performing the cell reselection by the UE during a specific time period $T_{CRmax}$, exceeds a first threshold $N_{CR\_H}$, the UE mobility state satisfies a condition of the high mobility state. Meanwhile, if the number of times of performing the cell reselection by the UE during the specific time period $T_{CRmax}$ exceeds a second threshold $N_{CR\_M}$ and does not exceed the first threshold $N_{CR\_H}$, the UE mobility state satisfies a condition of the medium mobility state. If the number of times of performing the cell reselection by the UE during the specific time period $T_{CRmax}$ does not exceed the second threshold $N_{CR\_M}$, the UE mobility state satisfies a condition of the normal mobility state. However, when the UE performs the cell reselection continuously between the two identical cells, it may not be counted as the number of times of performing the cell reselection.

The UE in the RRC_CONNECTED state reports a measurement result and performs a handover if a specific condition is satisfied in neighboring cell measurement. If the number of times of performing the handover by the UE during a specific time period exceeds the first threshold, the UE mobility state satisfies the condition of the high mobility state. Meanwhile, if the number of times of performing the handover by the UE during the specific time period exceeds a second threshold and does not exceed the first threshold, the UE mobility state satisfies the condition of the medium mobility state. If the number of times of performing the handover by the UE during the specific time period does not exceed the second threshold, the UE mobility state satisfies the condition of the normal mobility state.

The UE in the RRC_IDLE or RRC_CONNECTED state can enter a corresponding mobility state if it is detected that the aforementioned mobility state condition is satisfied. Entering the corresponding mobility state may be a process in which the UE determines that its mobility state is the corresponding mobility state. However, if it is determined that both of the high mobility state condition and the medium mobility state condition are not satisfied during the specific time period, the UE can enter the normal mobility state.

When determining the mobility state, the UE can scale the mobility parameter on the basis of the mobility state. The UE in the RRC_IDLE state can scale a parameter Tselection, and the UE in the RRC_CONNECTED state can scale a parameter TimeToTrigger. The scaling may be implemented by multiplying the parameter Tselection or the parameter TimeToTrigger by a specific scaling factor. The scaling factor may vary depending on the UE mobility state. For example, a scaling factor at the high mobility state may be less than a scaling factor at the medium mobility state. The scaling may not be performed in the normal mobility state. The scaling can be performed not only by the UE but also by the network or the cell, and information thereon can be provided to the UE.

First, scaling applied to the parameter Tselection used for the cell reselection by the UE in the RRC_IDLE state will be described in detail.

1) In case of the normal mobility state (neither medium nor high mobility state)

Tselection is not scaled.

2) In case of the high mobility state

In E-UTRAN, scaling is performed by multiplying $Tselection_{EUTRA}$ by a scaling factor sf-high.

In UTRAN, scaling is performed by multiplying $Tselection_{UTRA}$ by the scaling factor sf-high.

In GERAN, scaling is performed by multiplying $Tselection_{GERA}$ by the scaling factor sf-high.

In CDMA2000 HRPD, scaling is performed by multiplying $Tselection_{CDMA\_HRPD}$ by the scaling factor sf-high.

In CDMA2000 1xRTT, scaling is performed by multiplying $Tselection_{CDMA\_1xRTT}$ by the scaling factor sf-high.

3) In case of the medium mobility state

In E-UTRAN, scaling is performed by multiplying $Tselection_{EUTRA}$ by a scaling factor sf-medium.

In UTRAN, scaling is performed by multiplying $Tselection_{UTRA}$ by the scaling factor sf-medium.

In GERAN, scaling is performed by multiplying $Tselection_{GERA}$ by the scaling factor sf-medium.

In CDMA2000 HRPD, scaling is performed by multiplying $Tselection_{CDMA\_HRPD}$ by the scaling factor sf-medium.

In CDMA2000 1xRTT, scaling is performed by multiplying $Tselection_{CDMA\_1xRTT}$ by the scaling factor sf-medium.

An information parameter (e.g., a scaling factor) required for scaling of the parameter Tselection by the UE in the RRC_IDLE state can be provided to the UE by being included in system information to be broadcast. The UE can perform scaling when the system information includes the information parameter for scaling.

Next, scaling applied to the parameter TimeToTrigger used for a measurement report and/or a handover by the UE in the RRC_CONNECTED state will be described in detail.

1) In case of the normal mobility state (neither medium nor high mobility state)

TimeToTrigger is not scaled.

2) In case of the high mobility state

Scaling is performed by multiplying TimeToTrigger by a scaling factor sf-high.

3) In case of the medium mobility state

Scaling is performed by multiplying TimeToTrigger by a scaling factor sf-medium.

As described above, by applying a different mobility parameter according to the UE mobility state, mobility can be performed more properly. For example, if the UE moves at a fast speed, when scaling suitable for the high mobility state is performed by using mobility estimation through MSE, the UE can perform mobility more rapidly on the basis of a decreased mobility parameter.

A UE may move to a cell having a frequency different from a frequency of a current serving cell because a coverage of the current serving cell frequency is not enough, that is, because the UE may be located out of a coverage serviced according to the current frequency. Alternatively, the UE may move to the cell because the UE exists in a coverage of a corresponding frequency but is configured by a network such that the UE moves to another frequency for a network operation policy or load balancing.

When the UE is located out of the current frequency coverage and thus moves to a cell of another frequency, it can be assumed that mobility is performed by actual physical movement of the UE. In this case, it can be determined that a mobility state estimated by MSE properly considers actual UE mobility.

However, if the UE moves to another frequency cell in a situation where the current frequency coverage is enough, there is a high possibility that the UE does not perform the mobility by actually moving in a physical manner. This is because, in inter-frequency mobility, the mobility can be performed according to a priority assigned to a cell frequency rather than a location of the UE/quality of a service provided to the UE. In this case, by increasing a mobility counter which is the number of times of performing the mobility according to performing of the mobility without actually movement, the UE can determine that a mobility state estimated based on MSE is higher than an actual mobility state.

As examples of the above inter-frequency mobility, it would be considered autonomous highest priority setting for the frequency where member CSG exists or MBMS service is provided. When a UE detects a member CSG cell, the UE sets a frequency priority of the member CSG cell as the highest priority. That is, a cell reselection priority of a frequency of the corresponding CSG cell is higher than priorities of the other frequencies in a cell reselection priority list received from a network. Therefore, in spite of a cell reselection priority according to the cell reselection priority list, the cell reselection priority of the frequency of the CSG cell is set the highest. However, the priorities of the other frequencies maintain.

Further, when a UE intends to receive MBMS service and the UE is located in an area where the corresponding MBMS service is provided, the UE sets a cell reselection priority of a frequency for the MBMS service as the highest priority. That is, the priority of the frequency for the MBMS service is higher than priorities of the other frequencies in a cell reselection priority list received from a network. Therefore, in spite of a cell reselection priority according to the cell reselection priority list, the cell reselection priority of the frequency for the MBMS service is set the highest. But, the priorities of the other frequencies maintain.

As the above mentioned, a inter-frequency mobility to the frequency with the assigned highest priority can make the UE determine that a mobility state estimated based on MSE is higher than an actual mobility state by increasing a mobility counter without actually movement.

This will be described below in detail with reference to FIG. 16.

Figure 16:
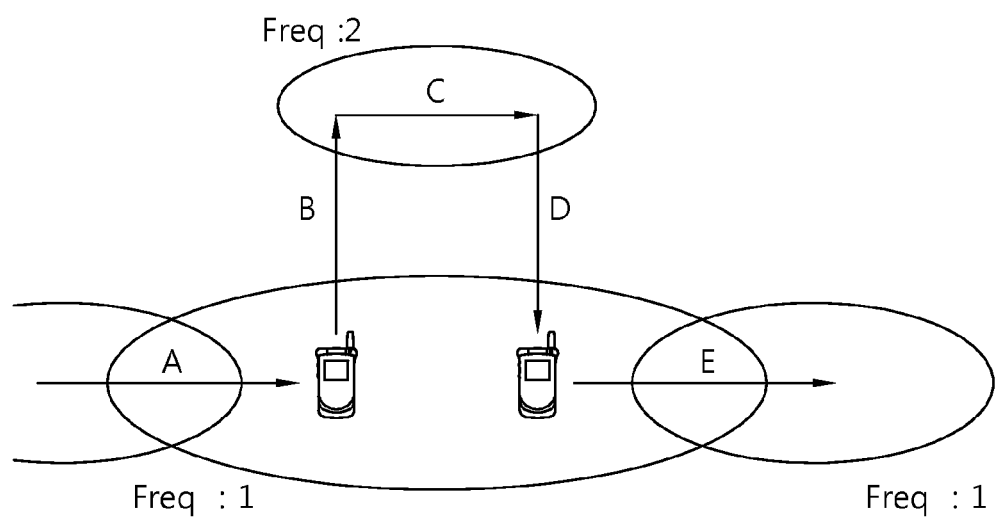
FIG. 16 illustrates an example of mobility performed by a UE in a wireless communication system.

FIG. 16 illustrates an example of mobility performed by a UE in a wireless communication system.

Referring to FIG. 16, a UE actually moves along paths A, C, and E. Among the paths, the paths A and E on which a cell reselection or a handover is performed are subjected to the mobility performed by the UE, and are targets of mobility counting.

Although the UE does not actually move along paths B and D, the paths B and D correspond to paths on which the cell reselection or the handover is performed. The paths B and D are paths on which the mobility is performed by the UE, and are targets of mobility counting.

According to the conventional MSE, among steps A to E, a mobility counter is updated after the steps A, B, D, and E. However, since the steps B and D are targets of mobility counting even if the UE does not actually move thereon, it may be a factor of causing an error when the UE actually determines a mobility state.

In the above case, the mobility state of the UE can be determined to an unnecessarily high state, which may cause a problem in which a mobility parameter such as Tselection or TimeToTrigger is not properly scaled.

In order to solve a problem in which the mobility counter is updated even in case of performing mobility not related to actual UE movement, a method of supporting mobility of a UE on the basis of a selective mobility counter updated by the UE will be described hereinafter.

The UE can update the mobility only when a specific condition is satisfied even after the mobility is performed. That is, the mobility counter can be incremented when the specific condition is satisfied, and the mobility counter can be maintained when the specific condition is not satisfied.

No-updating criteria which are conditions in which the UE does not update the mobility counter can be given as follows.

(1) When mobility to a target cell is performed in a state where quality of a source cell is greater than or equal to a specific threshold.

(2) When the quality of the source cell is better than that of a target cell (The quality of the source cell: a measured value of the source cell+a first offset, The quality of the target cell: a measured value of the target cell+a second offset).

(3) When a frequency of the source cell is different from a frequency of the target cell.

(4) When a frequency priority of the target cell is higher than a frequency priority of the source cell.

(5) (1)+(3), when the frequency of the target cell is different from the frequency of the source cell, and the mobility to the target cell is performed when the quality of the source cell is greater than or equal to a specific threshold.

(6) (2)+(3), when the frequency of the target cell is different from the frequency of the source cell, and the quality of the source cell is worse than that of the target cell.

(7) (1)+(4), when a frequency priority of the target cell is higher than a frequency priority of the source cell, and the mobility to the target cell is performed in a case where the quality of the source cell is greater than or equal to a specific threshold.

(8) (2)+(4), when the frequency priority of the target cell is greater than the frequency priority of the source cell, and the quality of the source cell is better than that of the target cell.

(9) when the UE autonomously performs mobility to a specific cell on serving frequency or inter frequency for prioritizing the specific cell or the specific frequency where a specific service is provided. (that is, when the UE autonomously moves to other cell on serving frequency or inter-frequency not by normal cell reselection according to signalled reselection frequency priority information but by prioritizing a member CSG cell of the UE or a femto cell or a frequency where a MBMS service is provided.)

Criteria based on the quality of the source cell are based on a fact that the quality of the source cell may be gradually decreased when the UE moves close to a boundary of the source cell. That is, if the quality of the source cell is higher than a specific threshold, it can be determined that the UE does not perform the mobility at a location near the boundary of the source cell. Therefore, such a condition can be used as a condition of not updating the mobility counter.

Next, a case where the frequency of the source cell is different from the frequency of the target cell corresponds to a case where inter-frequency mobility is performed. Since the inter-frequency mobility is performed on the basis of a priority assigned to a frequency rather than a movement/location of the UE, it can be determined that the UE does not perform the mobility at a location near the boundary of the source cell. When a priority of the target cell frequency is higher than a priority of the source cell, the aforementioned determination can be more reliably supported.

In order to determine whether the aforementioned criteria are satisfied, information on a cell environment may be necessary when the mobility is performed by the UE. This is called a mobility context. When the UE determines to perform the mobility together with a cell reselection or a handover, the mobility context required to determine whether the aforementioned criteria are satisfied can be obtained.

The mobility context may include measurement quality of the source cell at a time in which the UE determines to perform the mobility. The measurement quality may include reference signal received power (RSRP) and/or reference signal received quality (RSRQ).

The mobility context may include a frequency priority of the source cell and/or a frequency priority of the target cell at a time in which the UE determines to perform the mobility.

The mobility context may further include a threshold for determining a level of the quality of the source cell. However, the threshold may be an information parameter pre-configured from a network or a specific cell.

Next, a method of supporting mobility of a UE on the basis of the aforementioned no-updating criteria will be described with reference to the accompanying drawings.

Figure 17:
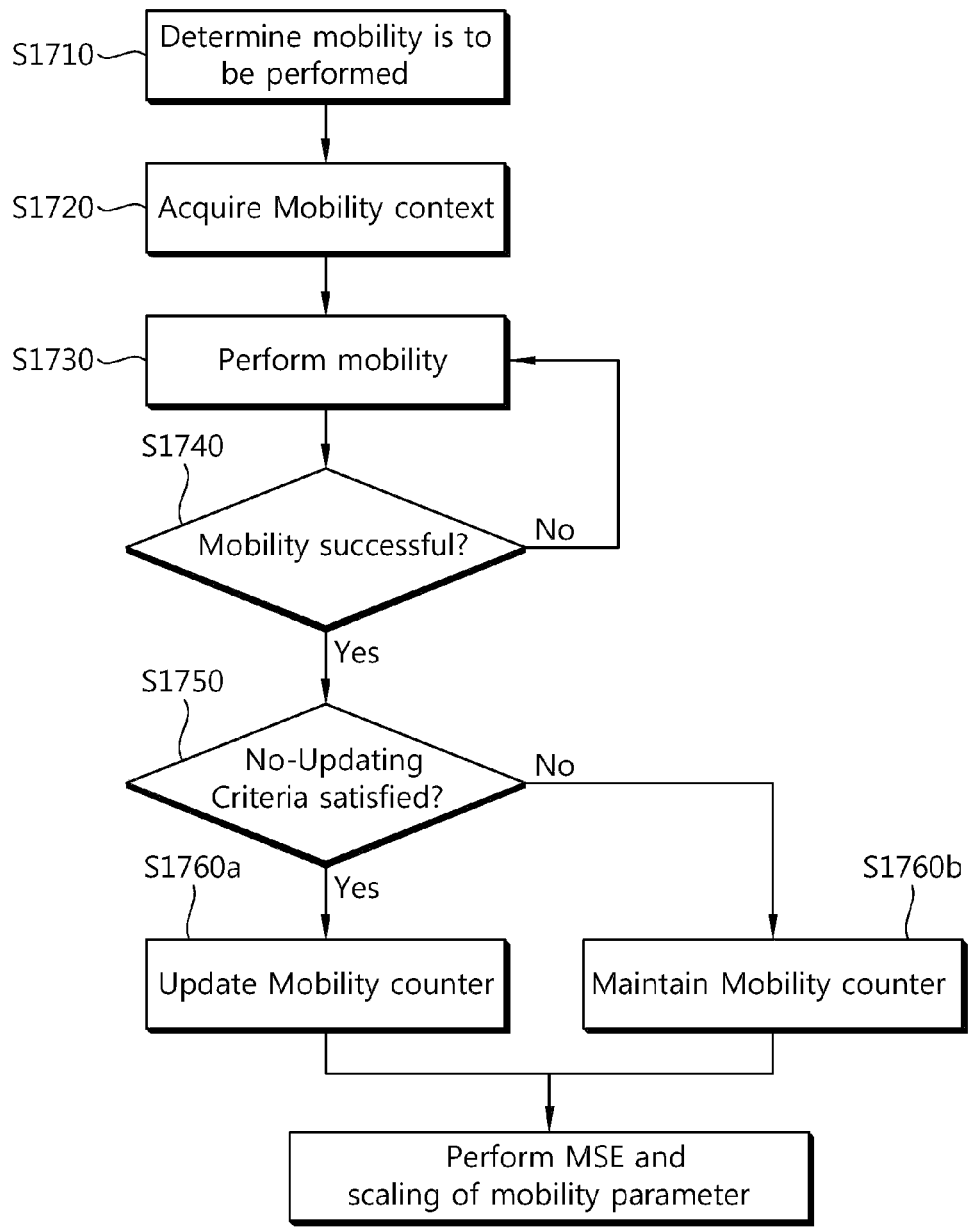
FIG. 17 shows an example of a method for supporting mobility on the basis of a selective mobility counter update of a UE according to an embodiment of the present invention.

FIG. 17 shows an example of a method for supporting mobility on the basis of a selective mobility counter update of a UE according to an embodiment of the present invention.

Referring to FIG. 17, the UE determines to perform the mobility (step S1710). The determining to perform the mobility by the UE may include confirming by the UE in an RRC_IDLE state that a condition for a cell reselection is satisfied, and determining to perform the cell reselection.

The determining to perform the mobility by the UE may include performing a measurement report by the UE in an RRC_CONNECTED state when a condition for a handover is satisfied, receiving a handover command message corresponding to the measurement report, and determining to perform a handover to a target cell.

Upon determining to perform the mobility, the UE obtains a mobility context (step S1720). The mobility context may include the aforementioned source cell quality (i.e., RSRP, RSRQ), a source cell frequency, a target cell frequency, a source cell frequency priority, and/or a target cell frequency priority. The mobility context may further include information regarding a threshold for recognizing a level of the source cell quality.

The UE performs the mobility (step S1730). The UE in the RRC_IDLE state can perform the cell reselection. The UE in the RRC_CONNECTED state can perform the handover.

The UE confirms whether the mobility is successfully performed (step S1740). When the mobility is not successfully performed, the mobility can be performed again.

After performing the mobility, the UE determines whether no-updating criteria are satisfied on the basis of the mobility context (step S1730). It can be determined according to whether one or more of the criteria (1) to (8) above are satisfied. For example, if a priority of the target cell frequency is higher than a priority of the source cell frequency and if the quality of the source cell is greater than or equal to a specific threshold, the UE can determine that the no-updating criteria are satisfied.

If the no-updating criteria are satisfied, the UE does not update the mobility counter but maintains the mobility counter (step S1760a).

If the no-updating criteria are not satisfied, the UE does not update the mobility counter (step S1760b). The updating of the mobility counter may be incrementing of the previous mobility counter by a specific value. The specific value may be a positive 1.

The UE performs MSE and scaling of a mobility parameter on the basis of the mobility counter (step S1770). The MSE and the scaling of the mobility parameter, which are performed by the UE, can be performed similarly to the aforementioned MSE and mobility parameter scaling method performed by the UE in the RRC_IDLE state and/or the UE in the RRC_CONNECTED state.

Figure 18:
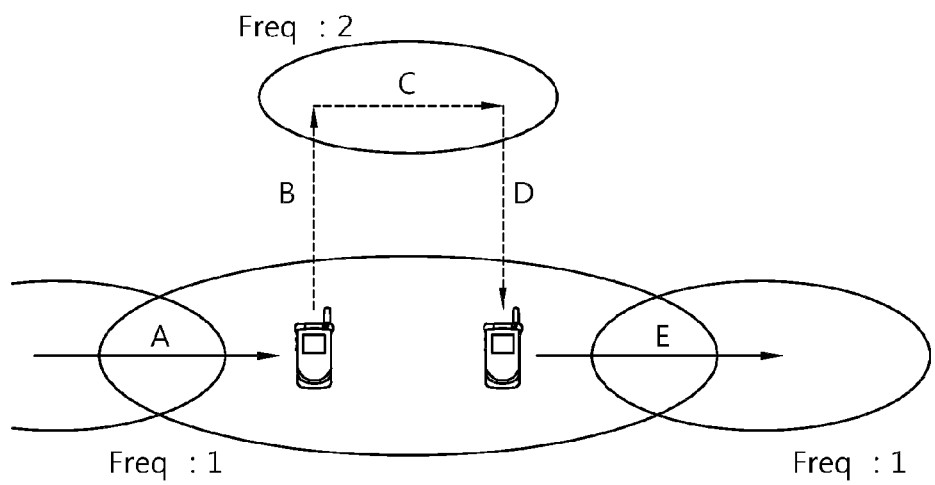
FIG. 18 shows an effect obtained by a method of supporting mobility of a UE on the basis of selective mobility counting according to an embodiment of the present invention.

FIG. 18 shows an effect obtained by a method of supporting mobility of a UE on the basis of selective mobility counting according to an embodiment of the present invention.

Referring to FIG. 18, the UE performs the mobility through steps A, B, D, and E. A step C corresponds to movement of the UE in a cell, and thus does not correspond to performing of the mobility of the UE.

According to the conventional mobility counting, the UE performs the mobility four times, and thus a mobility counter is updated four times. More particularly, if a value of the mobility counter of the UE is 'N' before performing the step A, a value of the mobility counter after performing up to the step E is 'N+4'. On the other hand, the performing of the mobility that can be considered in an actual mobility state of the UE corresponds to the steps A and E. Therefore, it is difficult to see that a finally updated mobility counter properly shows the actual mobility state of the UE.

On the other hand, according to the embodiment of the present invention, the mobility counter is not updated after the steps B and D corresponding to inter-frequency mobility are performed. However, the mobility counter can be updated after performing the mobility through the steps A and E. The mobility counter updated in this manner fully considers an actual UE mobility state. In this case, MSE and scaling of the mobility parameter are performed on the basis of the actual UE mobility state and thus can more properly support performing of the mobility of the UE.

Figure 19:
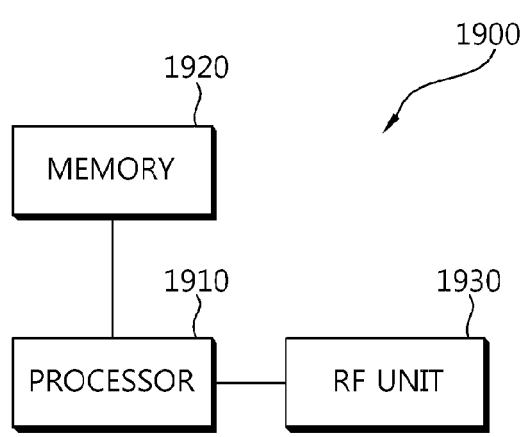
FIG. 19 is a block diagram showing a wireless apparatus according to an embodiment of the present invention.

FIG. 19 is a block diagram showing a wireless apparatus according to an embodiment of the present invention. The apparatus implements an operation of a UE according to the embodiments of FIG. 16 to FIG. 18.

A wireless apparatus 1900 includes a processor 1910, a memory 1920, and a radio frequency (RF) unit 1930. The processor 1910 implements the proposed functions, procedures, and/or methods. The processor 1910 determines whether the UE will perform mobility. The processor 1910 obtains a mobility context which is basis information for determining non-updating criteria. The memory 1920 can store the obtained mobility context. The processor 1910 performs the mobility and determines whether the non-updating criteria are satisfied. The processor 1910 maintains the previous mobility counter when the non-updating criteria are satisfied. The processor 1910 updates the mobility counter when it is determined that the non-updating criteria are dissatisfactory. The processor 1910 performs MSE and scaling of a mobility parameter on the basis of the mobility counter. The embodiments of FIG. 16 to FIG. 18 can be determined by the processor 1910 and the memory 1920.

The RF unit 1930 coupled to the processor 1910 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method for supporting a mobility of a user equipment (UE) in a wireless communication system, the method comprising:
    acquiring, by the UE, mobility context;
    performing, by the UE, the mobility with a target cell;
    determining, by the UE, whether non-updating criterion is satisfied based on the mobility context;
    incrementing, by the UE, a mobility counter of the UE by a predetermined value when the non-updating criterion is not satisfied;
    not incrementing, but maintaining, by the UE, the mobility counter of the UE when the non-updating criterion is satisfied although the mobility with the target cell has been performed;
    performing, by the UE, a mobility state estimation (MSE) by estimating a mobility state of the UE based on the mobility counter of the UE; and
    scaling, by the UE, a mobility parameter based on the estimated mobility state,
    wherein the mobility context includes one or more among a measured quality of a source cell, a source cell frequency, a target cell frequency, a priority of the source cell frequency and a priority of the target cell frequency, and
    wherein the mobility counter is maintained, although the mobility with the target cell has been performed, if the target cell frequency is different from the source cell frequency, and if the measured quality of the source cell is greater than a predetermined threshold.

2. The method of claim 1, wherein the mobility counter is maintained, although the mobility with the target cell has been performed, if the priority of the target cell frequency is greater than the priority of the source cell frequency.

3. The method of claim 1, wherein the step of the performing the mobility with the target cell includes performing cell reselection with the target cell, if the UE operates in an RRC_IDLE mode.

4. The method of claim 3, wherein the step of the performing the mobility with the target cell further includes performing handover with the target cell, if the UE operates in an RRC_CONNECTED mode.

5. A wireless apparatus comprising:

a radio frequency (RF) unit transmitting and receiving a radio signal;

a processor operably coupled to the RF unit and configured to:

acquire mobility context;

perform mobility with a target cell;

determine whether non-updating criterion is satisfied based on the mobility context;

increment a mobility counter of the wireless apparatus by a predetermined value when the non-updating criterion is not satisfied;

not increment, but maintain the mobility counter of the wireless apparatus when the non-updating criterion is satisfied although the mobility with the target cell has been performed;

perform a mobility state estimation (MSE) by estimating a mobility state of the wireless apparatus based on the mobility counter of the wireless apparatus; and scale a mobility parameter based on the estimated mobility state, wherein the mobility context includes one or more among a measured quality of a source cell, a source cell frequency, a target cell frequency, a priority of the source cell frequency and a priority of the target cell frequency, and wherein the processor is further configured to maintain the mobility counter, although the mobility with the target cell has been performed, if the target cell frequency is different from the source cell frequency, and if the measured quality of the source cell is greater than a predetermined threshold.

* * * * *